United States Patent
Song et al.

(10) Patent No.: US 10,484,907 B2
(45) Date of Patent: Nov. 19, 2019

(54) COMMUNICATION METHOD AND APPARATUS BASED ON QUALITY OF SERVICE (QOS) IN NETWORK SLICE-BASED MOBILE COMMUNICATION NETWORK

(71) Applicant: ELECTRONICS AND TELECOMMUNICATIONS RESEARCH INSTITUTE, Daejeon (KR)

(72) Inventors: Ho Young Song, Daejeon (KR); Jongtae Song, Daejeon (KR); Tae Whan Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 232 days.

(21) Appl. No.: 15/639,462

(22) Filed: Jun. 30, 2017

(65) Prior Publication Data

US 2018/0014222 A1 Jan. 11, 2018

(30) Foreign Application Priority Data

Jul. 5, 2016 (KR) .................. 10-2016-0085039
Jun. 7, 2017 (KR) .................. 10-2017-0070751

(51) Int. Cl.
*H04W 28/02* (2009.01)
*H04W 48/06* (2009.01)
*H04W 72/04* (2009.01)

(52) U.S. Cl.
CPC ... *H04W 28/0268* (2013.01); *H04W 28/0257* (2013.01); *H04W 48/06* (2013.01); *H04W 72/0413* (2013.01)

(58) Field of Classification Search
CPC ......... H04W 28/0252–00257; H04W 28/0268; H04W 28/0289; H04W 28/16; H04W 48/06; H04W 72/0413; H04W 72/1284
See application file for complete search history.

(56) References Cited

U.S. PATENT DOCUMENTS

2011/0058558 A1  3/2011  Kim et al.
2015/0195764 A1  7/2015  Chung et al.
(Continued)

FOREIGN PATENT DOCUMENTS

KR  10-2015-0116092 A  10/2015

OTHER PUBLICATIONS

"3rd Generation Partnership Project; Technical Specification Group Services and System Aspects; Study on Architecture for Next Generation System" 3GPP TR 23.799 V0.5.0, May 2016.

*Primary Examiner* — Eric Myers
(74) *Attorney, Agent, or Firm* — LRK Patent Law Firm

(57) ABSTRACT

Communication method and apparatus based on QoS in network slice-based mobile communication network. The method includes determining whether first sum of bitrate of SDF requested from PDU and a using NSB of network slice corresponding to requested SDF exceeds reference NSB allocated to network slice, determining whether second sum of bitrate of requested SDF and a first using SB of APN corresponding to requested SDF exceeds first reference SB allocated to APN, unless the first sum exceeds the reference NSB, determining whether third sum of bitrate of requested SDF and a second using SB of PDU flow corresponding to requested SDF exceeds second reference SB allocated to PDU flow, unless the second sum exceeds the first reference SB, and processing the requested SDF to guarantee that (Continued)

quality of requested SDF is greater than or equal to a predetermined level, unless the third sum exceeds the second reference SB.

13 Claims, 18 Drawing Sheets

(56) References Cited

U.S. PATENT DOCUMENTS

2016/0352645 A1* 12/2016 Senarath ................. H04L 47/41
2017/0367116 A1* 12/2017 Li ......................... H04W 74/08
2019/0132781 A1* 5/2019 Arnold .................. G06F 9/5077

* cited by examiner

FIG. 17

| QoS parameters | | UP functions | AN | UE |
|---|---|---|---|---|
| Flow Priority Indicator (FPI) | | * | * | * |
| Flow Priority Level (FPL) | | | * | |
| Packet Priority Indicator (PPI) | | * | * | * |
| Packet Discard Priority Indicator (PDPI) | | * | * | * |
| Flow Descriptor | DL | * | * | |
| | UL | * | * | * |
| Maximum Flow Bitrate (MFB) | DL | | * | |
| | UL | | * | |
| Guarantee Flow Bitrate (GFB) | DL | * | * | |
| | UL | * | * | * (1) |
| Session Bitrate (SB) | DL | * | * | |
| | UL | * | | |
| Network Slice Bitrate (NSB) | DL | * | | |
| | UL | * | | * |
| Reflective QoS Indication (RQI) | DL | * | * | * |

COMMUNICATION METHOD AND APPARATUS BASED ON QUALITY OF SERVICE (QOS) IN NETWORK SLICE-BASED MOBILE COMMUNICATION NETWORK

CROSS-REFERENCE TO RELATED APPLICATION(S)

This application claims the priority benefit of Korean Patent Application No. 10-2016-0085039, filed on Jul. 5, 2016, and Korean Patent Application No. 10-2017-0070751, filed on Jun. 7, 2017, in the Korean Intellectual Property Office, the disclosures of which are incorporated herein by reference for all purposes.

BACKGROUND

1. Field

At least one example embodiment relates to a communication method and apparatus based on quality of service (QoS) in a network slice-based mobile communication network.

2. Description of Related Art

In current mobile communication technology, a radio access network (RAN) or a core network is not virtualized using a network slice. Thus, it may be difficult to apply new technology or to provide a service. To outperform such issues, research on applying network virtualization technology, for example, a network function virtualization (NFV) and a service digital network (SDN), to a next generation mobile communication is ongoing.

If the network virtualization technology is applied to mobile communication, a user, for example, a user equipment (UE), may use one or more network slices. However, there is no technology that guarantees network slice-based quality of service (QoS). Accordingly, there is a need for technology that may guarantee QoS per network slice in a network slice-based mobile communication network.

SUMMARY

At least one example embodiment may provide a quality of service (QoS) parameter, procedure, method, and apparatus that may provide network slice-based QoS in a mobile communication. Since a network slice-based QoS processing method is provided from a user equipment (UE) to a network, a subscriber may use a high quality mobile communication service. That is, network slice-based QoS technology is proposed to guarantee the quality of a network slice-based mobile communication service.

According to an example embodiment, an aggregated bitrate for which a UE contracts with a network provider needs to be guaranteed even under a network slice structure to accomplish QoS guaranteeing. An available aggregated bitrate per network slice to achieve this goal may be defined as a network slice bitrate (NSB). For example, if the UE uses three network slices, three network slices, for example, NSB_slice1, NSB_slice2, and NSB_slice3, are present. That is, a quality guaranteeing bitrate for which the UE contracts with the network provider may relate to NSB_slice1 associated with a first network slice, NSB_slice2 associated with a second network slice, and NSB_slice3 associated with a third network slice. If the UE uses only a single network slice, the aggregated bitrate for which the UE contracts with the network provider may be defined as the NSB.

According to an aspect of at least one example embodiment, there is provided a communication method of a communication apparatus that communicates with a UE, the method including determining whether a first sum of a bitrate of a service data flow (SDF) requested from a packet data unit (PDU) and a using network slice bitrate (NSB) of a network slice corresponding to the requested SDF exceeds a reference NSB allocated to the network slice; determining whether a second sum of the bitrate of the requested SDF and a first using session bitrate (SB) of an access point network (APN) corresponding to the requested SDF exceeds a first reference SB allocated to the APN, when the first sum is determined to not exceed the reference NSB; determining whether a third sum of the bitrate of the requested SDF and a second using SB of a PDU flow corresponding to the requested SDF exceeds a second reference SB allocated to the PDU flow, when the second sum is determined to exceed the first reference SB; and processing the requested SDF to guarantee that a quality of the requested SDF is greater than or equal to a predetermined level, when the third sum is determined to exceed the second reference SB.

The processing of the requested SDF may include delivering the requested SDF to the UE using the predetermined level or more of quality.

The communication method may further include processing the requested SDF without guaranteeing that the quality of the requested SDF is greater than or equal to the predetermined level in response to an occurrence of at least one of a case in which the first sum exceeds the reference NSB, a case in which the second sum exceeds the first reference SB, and a case in which the third sum exceeds the second reference SB.

The reference NSB may be determined for each network slice to be used by the UE based on a number of network slices to be used by the UE.

At least one of the reference NSB, the first reference SB, and the second reference SB may be set by a control plane function of the communication apparatus and applied to a user plane function of the communication apparatus.

The requested SDF may be processed based on a scheduling priority according to a flow priority indicator (FPI) set to the PDU flow corresponding to the requested SDF or a handling priority in case of congestion.

The requested SDF may correspond to a non-guaranteed PDF flow.

Traffic of the PDF flow may be processed on a user plane of a core network and an access network based on a PDU flow priority for admission to a network resource that is provided from the communication apparatus.

The determining whether the first sum exceeds the reference NSB, the determining whether the second sum exceeds the first reference SB, and the determining whether the third sum exceeds the second reference SB may be performed on a user plane of a core network of the communication apparatus.

The communication method may further include performing flow scheduling on the requested SDF based on the first reference SB on an access network of the communication apparatus.

According to an aspect of at least one example embodiment, there is provided a communication method of a UE that communicates with a communication apparatus, the method including determining whether a first sum of a bitrate of an SDF requested from the UE and a using UE bitrate of the UE exceeds a reference UE bitrate allocated to the UE; determining whether a second sum of the bitrate of the requested SDF and a using NSB of a network slice corresponding to the requested SDF exceeds a reference NSB allocated to the network slice, when the first sum is determined to not exceed the reference UE bitrate; and processing the requested SDF to guarantee that a quality of the requested SDF is greater than or equal to a predetermined level, when the second sum is determined to not exceed the reference NSB.

The communication method may further include determining whether a third sum of the bitrate of the requested SDF and a using session bitrate (SB) of an access point network (APN) corresponding to the requested SDF, when the second sum is determined to not exceed the reference NSB. The processing of the requested SDF may include processing the requested SDF to guarantee that the quality of the requested SDF is greater than or equal to the predetermined level, when the third sum is determined to not exceed a reference SB allocated to the APN.

The communication method may further include processing the requested SDF without guaranteeing that the quality of the requested SDF is greater than or equal to the predetermined level in response to an occurrence of at least one of a case in which the first sum exceeds the reference UE bitrate and a case in which the second sum exceeds the reference NSB.

At least one of the reference UE bitrate and the reference NSB may be set by a control plane function of the communication apparatus and applied to a user plane function of the communication apparatus.

The requested SDF may be processed based on a scheduling priority according to a flow priority indicator (FPI) set to the PDU flow corresponding to the requested SDF or a handling priority in case of congestion.

The requested SDF may correspond to a non-guaranteed PDF flow.

According to an aspect of at least one example embodiment, there is provided a communication apparatus including a processor; and a memory configured to store at least one instruction executable by the processor. When the at least one instruction is executed by the processor, the processor is configured to determine whether a first sum of a bitrate of an SDF requested from a PDU and a using NSB of a network slice corresponding to the requested SDF exceeds a reference NSB allocated to the network slice, to determine whether a second sum of the bitrate of the requested SDF and a first using SB of an APN corresponding to the requested SDF exceeds a first reference SB allocated to the APN, when the first sum is determined to not exceed the reference NSB, to determine whether a third sum of the bitrate of the requested SDF and a second using SB of a PDU flow corresponding to the requested SDF exceeds a second reference SB allocated to the PDU flow, when the second sum is determined to not exceed the first reference SB, and to process the requested SDF to guarantee that a quality of the requested SDF is greater than or equal to a predetermined level, when the third sum is determined to not exceed the second reference SB.

The processor may be configured to process the requested SDF without guaranteeing that the quality of the requested SDF is greater than or equal to the predetermined level in response to an occurrence of at least one of a case in which the first sum exceeds the reference NSB, a case in which the second sum exceeds the first reference SB, and a case in which the third sum exceeds the second reference SB.

The reference NSB may be determined for network slice to be used by a UE that communicates with the communication apparatus, based on a number of network slices to be used by the UE.

According to an aspect of at least one example embodiment, there is provided a communication apparatus that communicates with a UE, the communication apparatus including a processor; and a memory configured to store at least one instruction executable by the processor. When the at least one instruction is executed by the processor, the processor is configured to determine whether a first sum of a bitrate of an SDF requested from the UE and a using UE bitrate of the UE exceeds a reference UE bitrate allocated to the UE, to determine whether a second sum of the bitrate of the requested SDF and a using NSB of a network slice corresponding to the requested SDF exceeds a reference NSB allocated to the network slice, when the first sum is determined to not exceed the reference UE bitrate, and to process the requested SDF to guarantee that a quality of the requested SDF is greater than or equal to a predetermined level, when the second sum is determined to not exceed the reference NSB.

According to example embodiments, there is provided a method that may control network slice-based QoS in a network slice-based mobile communication system. The quality of a mobile communication service may be guaranteed by applying QoS parameters, frameworks, and procedures.

According to example embodiments, since a network slice-based QoS processing method is provided to a UE and a network, a subscriber may easily use a high quality mobile communication service. That is, network slice-based QoS technology is proposed to guarantee the quality of a network slice-based mobile communication service.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 17 illustrates an example of QoS parameters according to an example embodiment.

DETAILED DESCRIPTION OF THE INVENTION

Figure 1:
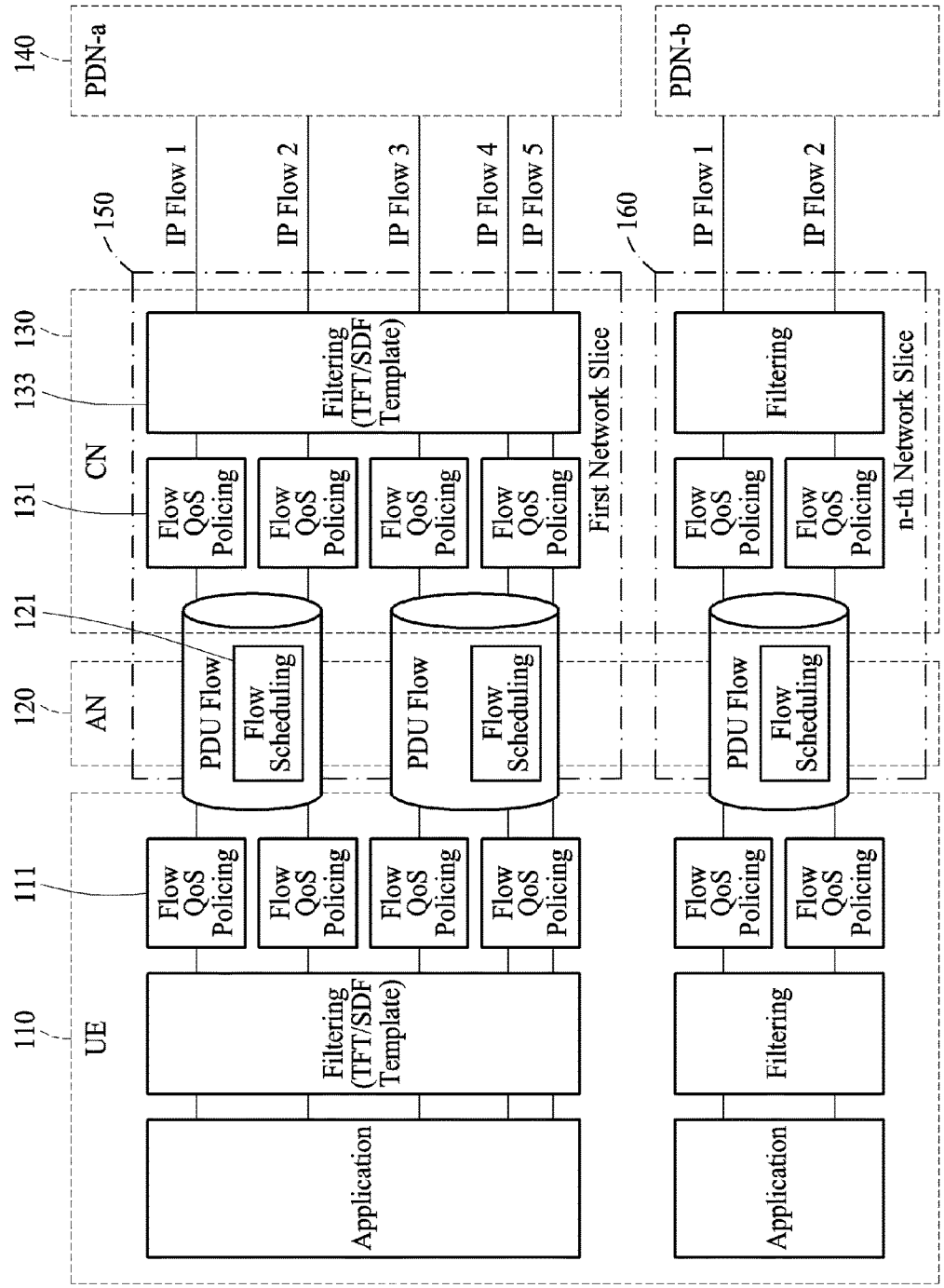
FIGS. 1 and 2 illustrate examples of a network system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The following example embodiments may be used to perform communication. Hereinafter, an operation of performing communication may include an operation of communication by using quality of service (QoS) parameters in a network system using a network slice. The example embodiments may be configured in various types of computing devices and/or systems, for example, a smartphone, a smart electronic device, a personal computer (PC), a laptop computer, a tablet computer, a wearable device, and the like, which are examples of user equipment (UE), or a server that constitutes a network, and the like. Hereinafter, the example embodiments will be described with reference to the accompanying drawings. Like reference numerals refer to like elements throughout.

Figure 2:
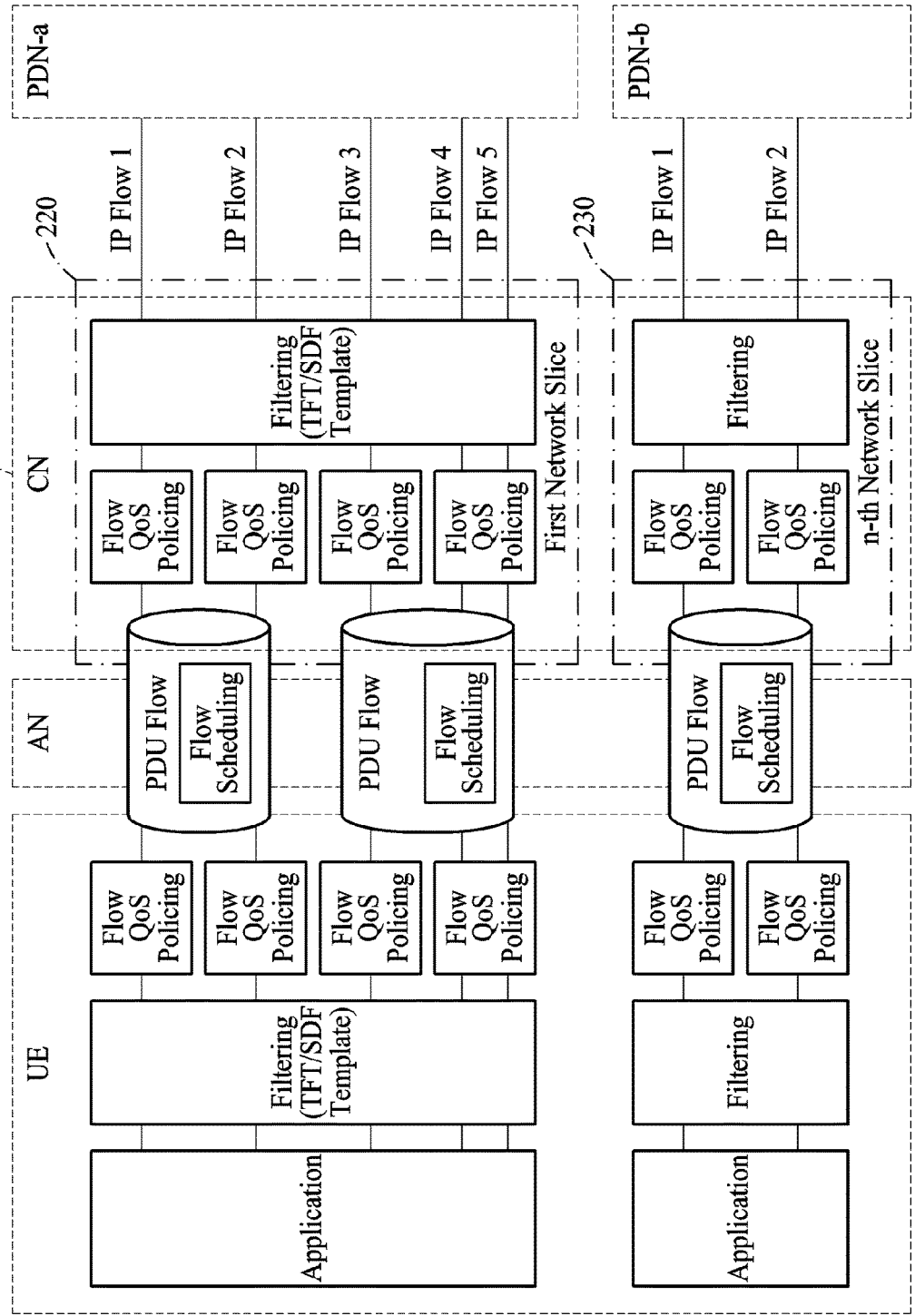

FIGS. 1 and 2 illustrate examples of a network system according to an example embodiment.

Disclosed are quality of service (QoS) parameters, frameworks, and QoS establishment/control procedures in a network slice-based mobile communication system according to an example embodiment. A UE may access a plurality of network slices and may also access a plurality of access point networks (APNs). A plurality of APN attachment service flows (or sessions) may be present in a single network slice. A plurality of packet data unit (PDU) flows may be present in a single session. A PDU flow that may be used by the UE may include a single guaranteed PDU flow and at least one non-guaranteed PDU flow. Depending on example embodiments, a single guaranteed PDU flow may be present per packet data network (PDN) provider. Only a single guaranteed PDU flow may be present in a single network slice.

The terms, scheduling and policing, used herein may be defined based on an existing communication method.

Network authorized QoS parameters may be defined. For example, QoS parameters per network slice may be defined as follows:

A network slice bitrate (NSB) indicates a bitrate authorized for an uplink (UL) and a downlink (DL) per network slice. The NSB defines the limit of an aggregated maximum bitrate of non-guaranteed PDU flows for each network slice.

A network slice priority (NSP) indicates a priority of a network slice. For example, a network slice of a relatively high NSP may have more resources, higher reliability/availability, and higher survivability in an emergency state than a network slice of a relatively low NSP. The NSP may be used to distinguish a public service, a premium service, and an emergency service.

A guaranteed PDU flow indicator (GFI) indicates whether a guaranteed PDU flow allocated to the UE is present. The UE may have a single guaranteed PDU flow among the plurality of network slices.

A UE bitrate indicates an aggregated bitrate for which the UE, for example, a subscriber, contracts with a mobile communication provider, or an aggregated bitrate that is provided from the mobile communication provider. The UE bitrate may have non-guaranteed bitrate (GBR) characteristics. That is, the quality of traffic that exceeds the UE bitrate may not be guaranteed.

A session bitrate (SB) indicates a maximum bitrate authorized for a service session, that is, an Internet protocol (IP) session.

A relationship between the aforementioned QoS parameters follows:

$$\text{UE Bitrate} = \sum_{i=1}^{n} NSBi \qquad \text{<Equation 1>}$$

In Equation 1, n denotes a number of network slices used or available by the UE.

$$NSB = \sum_{i=1}^{k} SBi \qquad \text{<Equation 2>}$$

In Equation 2, k denotes a number of sessions used or available in a network slice.

An initial value of the NSB may be set per network slice based on the contract between the mobile communication provider and the UE or strategy of the mobile communication provider. For example, the NSB may be determined by dividing the UE bitrate by a maximum number of network slices available by the UE. Alternatively, once an NSB of a first network slice used by the UE is set, an NSB of each of remaining network slices may be set to be variable or fixable per network slice by predicting or determining a number of network slices that may be used by the UE. That is, a different NSB may be determined for each network slice.

The example embodiments are applied to a network slice-based 5th generation mobile communication system, and nay be applicable to a structure in which network slicing is applied to an access network (AN) 120 and a core network (CN) 130 as illustrated in FIG. 1, or a structure in which network slicing is applied only to a CN 210 as illustrated in FIG. 2.

Referring to FIGS. 1 and 2, the example embodiments may be described based on four units by large. The example embodiments may include a UE 110 corresponding to a subscriber or a service terminal, the AN 120, the CN 130, and a PDN 140 corresponding to a service provider network.

Here, flow QoS policing 111 of the UE 110, flow scheduling 121 of the AN 120, flow QoS policing 131 and filtering 133 of the CN 130, a first network slice 150, and an n-th network slice 160 may be directly associated with the example embodiments.

As described above, network slices, for example, a first network slice 220 and an n-th network slice 230 of FIG. 2, may be defined only for the CN 210 in a mobile communication system.

Figure 3:
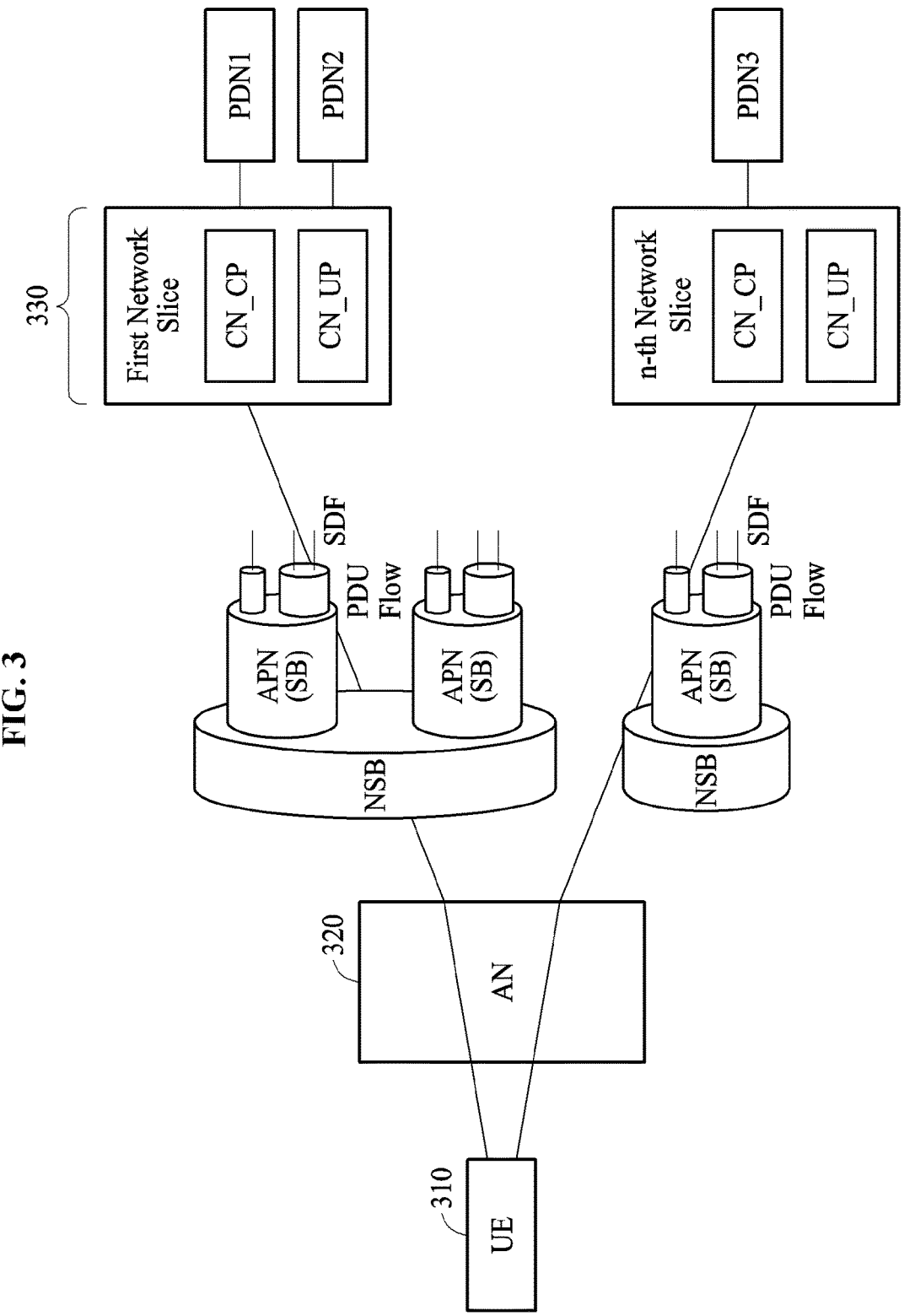
FIG. 3 illustrates an example of a service use of a user equipment (UE) according to an example embodiment.

FIG. 3 illustrates an example of a service use of a UE according to an example embodiment.

FIG. 3 hierarchically illustrates a service used by the UE according to an example embodiment.

Referring to FIG. 3, a single UE 310 may use a plurality of network slices 330. A plurality of service sessions may be set in a single network slice 330, and the UE 310 may perform communication using the service sessions. Here, a CN may include a control plane (CP) and a user plane (UP).

Although FIG. 3 illustrates an example embodiment in which network slicing is applied only to the CN, it is provided as an example only for clarity. Thus, the example embodiments may be applied to a structure in which network slicing is applied to each of an AN 320 the CN.

The hierarchical structure of FIG. 3 is described with reference to FIG. 7.

Figure 4:
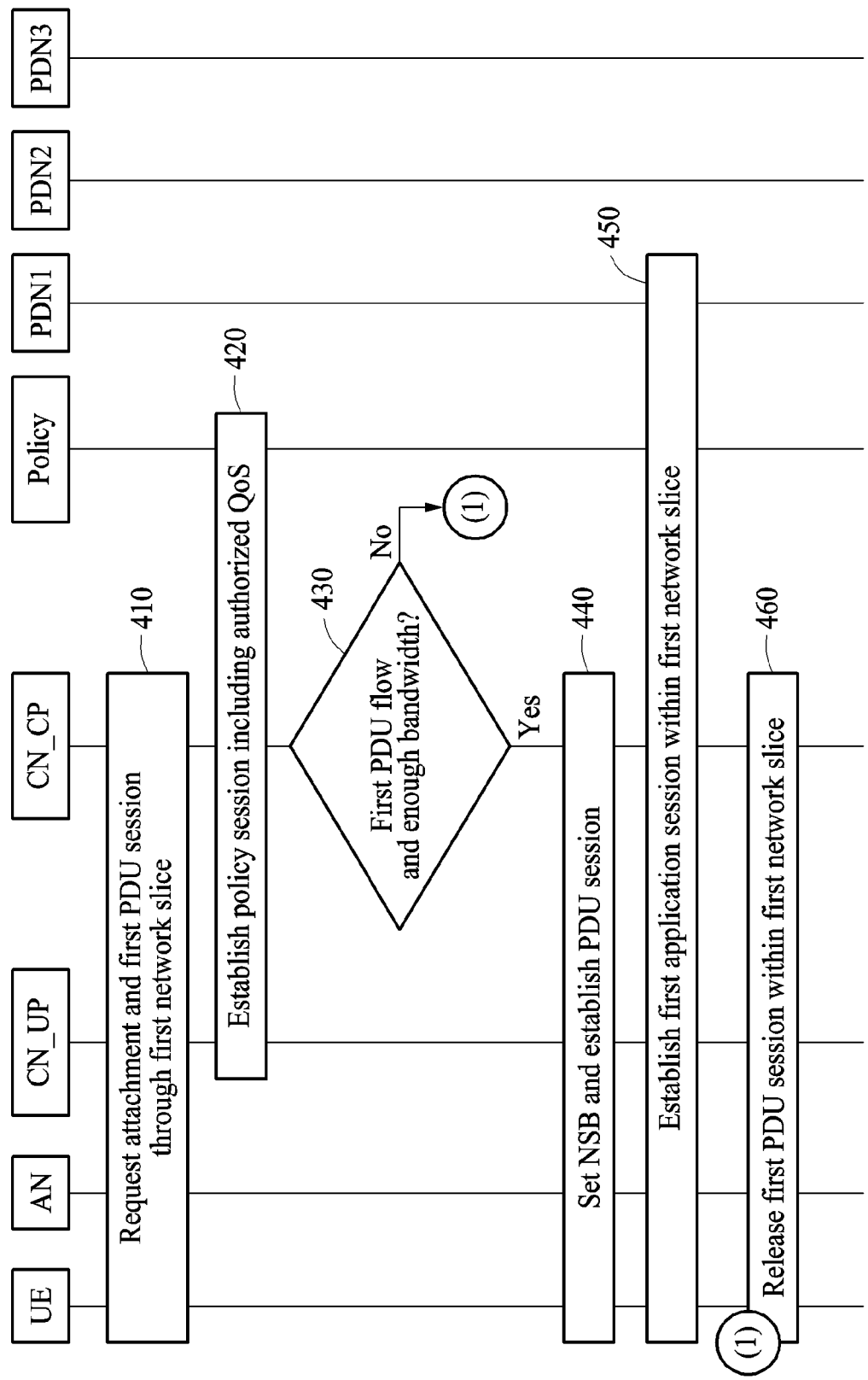
FIG. 4 illustrates an example of a process of establishing an initial service session according to an example embodiment.

FIG. 4 illustrates an example of a process of establishing an initial service session according to an example embodiment.

Hereinafter, an initial attachment process in which a UE sets a first service connection with PDN1 in a first network slice according to an example embodiment is described with reference to FIG. 4.

Referring to FIG. 4, in operation 410, the UE may request an attachment and a first PDU session through the first network slice.

In operation 420, a policy session that includes authorized QoS may be established.

In operation 430, whether a corresponding PDU flow is a first PDU flow and a bitrate to be allocated is available may be determined by inspecting all of the network slices used by the UE. For example, a policy function may be used to determine whether the corresponding PDU flow is the first PDU flow and the bitrate to be allocated is available within the UE.

When it is determined that the corresponding PDU flow is the first PDU flow and the bitrate to be allocated is available in operation 430, an NSB may be set and a PDU session for a service may be established in operation 440. Here, an NSB value may be set by a mobile communication provider based on a contract made with the UE, for example, a 5G service user. The mobile communication provider may set an initial NSB value per network slice based on a number of network slices used by the UE. In FIG. 4, the mobile communication provider may be represented as a PDN.

In operation 450, a first application session within the first network slice may be established.

When it is determined that the corresponding PDU flow is not the first PDU flow and the bitrate to be allocated is unavailable in operation 430, a first PDU session within the first network slice may be released in operation 460.

Figure 5:
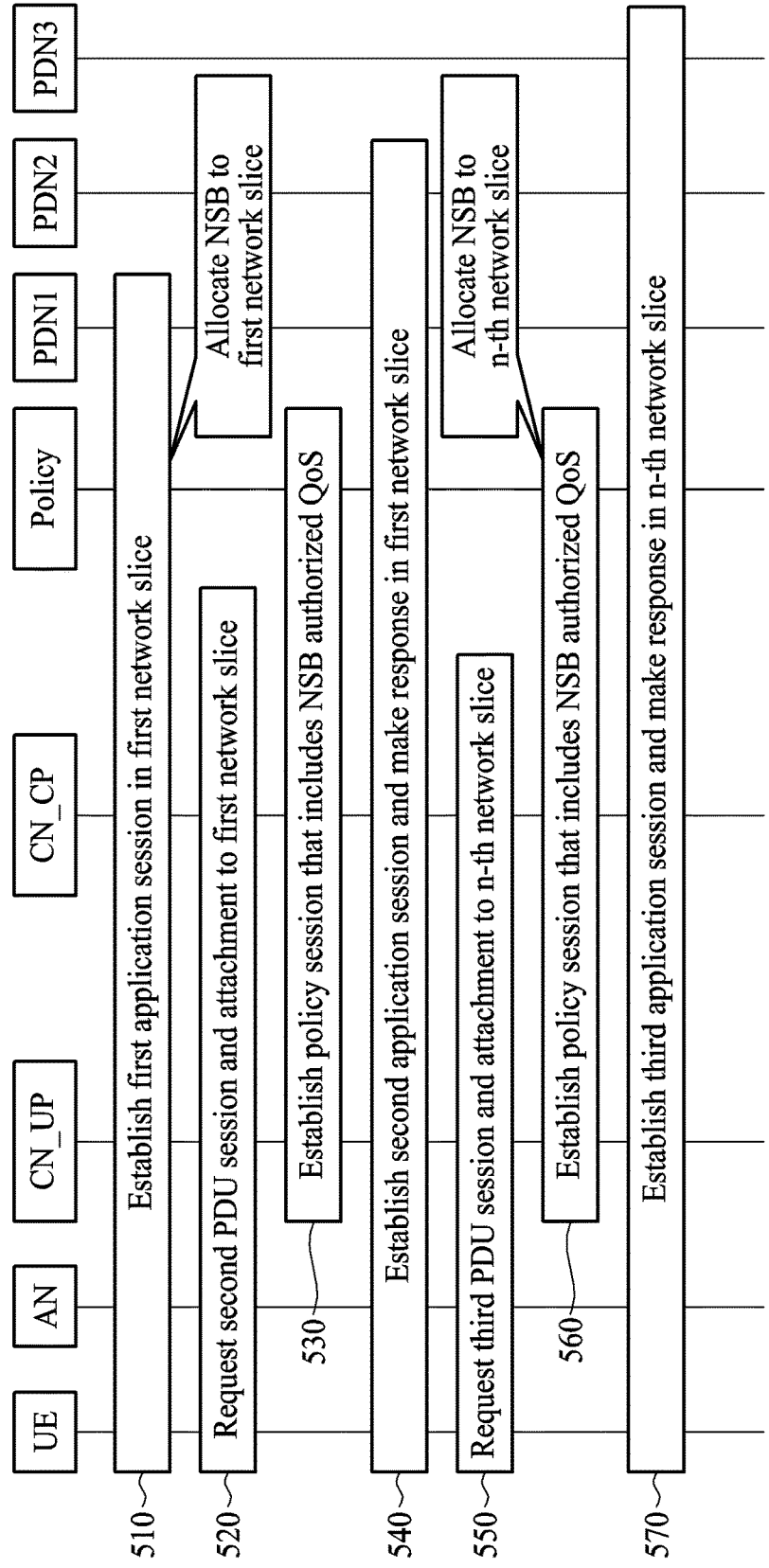
FIG. 5 illustrates an example of a process of establishing a service session based on a network slice bitrate (NSB) according to an example embodiment.

FIG. 5 illustrates an example of a process of establishing a service session based on an NSB according to an example embodiment.

Hereinafter, a process in which the UE establishes a service connection with three service providers, for example, PDN1, PDN2, and PDN3, using two network slices according to an example embodiment is described with reference to FIG. 5. For example, FIG. 5 may represent a method of applying an aggregated NSB.

In operation 510, the UE may be served or may maintain a connection through a first application session established in a first network slice.

In operation 520, the UE may request a core network control plane (CN_CP) for a second PDU session to connect a service with a second service provider, for example, PDN2, in the first network slice.

In operation 530, the CN_CP may request a policy to determine whether it is possible to provide a QoS service. For example, a policy session that includes an NSB authorized QoS may be established.

When the QoS service is determined to be providable, related QoS information may be provided to a core network user plane (CN_UP), an AN, the UE, and the like, and an application session for a service may be established in operation 540. That is, a PDU session in which a single UE may be served by two service providers on a single network slice may be established. For example, a second application session may be established in the first network slice and a response may be made.

In operation 550, the UE may request an n-th network slice for a third PDU session in order to be served by PDN3 corresponding to another service provider. This request may be a first service request for the n-th network service from a perspective of the UE.

In operation 560, in response to the service request from the UE, CN_CP of the n-th network slice may determine whether it is possible to provide QoS of a requested session establishment service through a question and an answer with the policy. For example, a policy session that includes NSB authorized QoS may be established.

When the service is determined to be providable, a service session may be established through the CN_CP, the AN, and the UE, and an application service session with PDN3 may be established in operation 570. For example, a third application session may be established in the n-th network slice and a response may be made.

Figure 6:
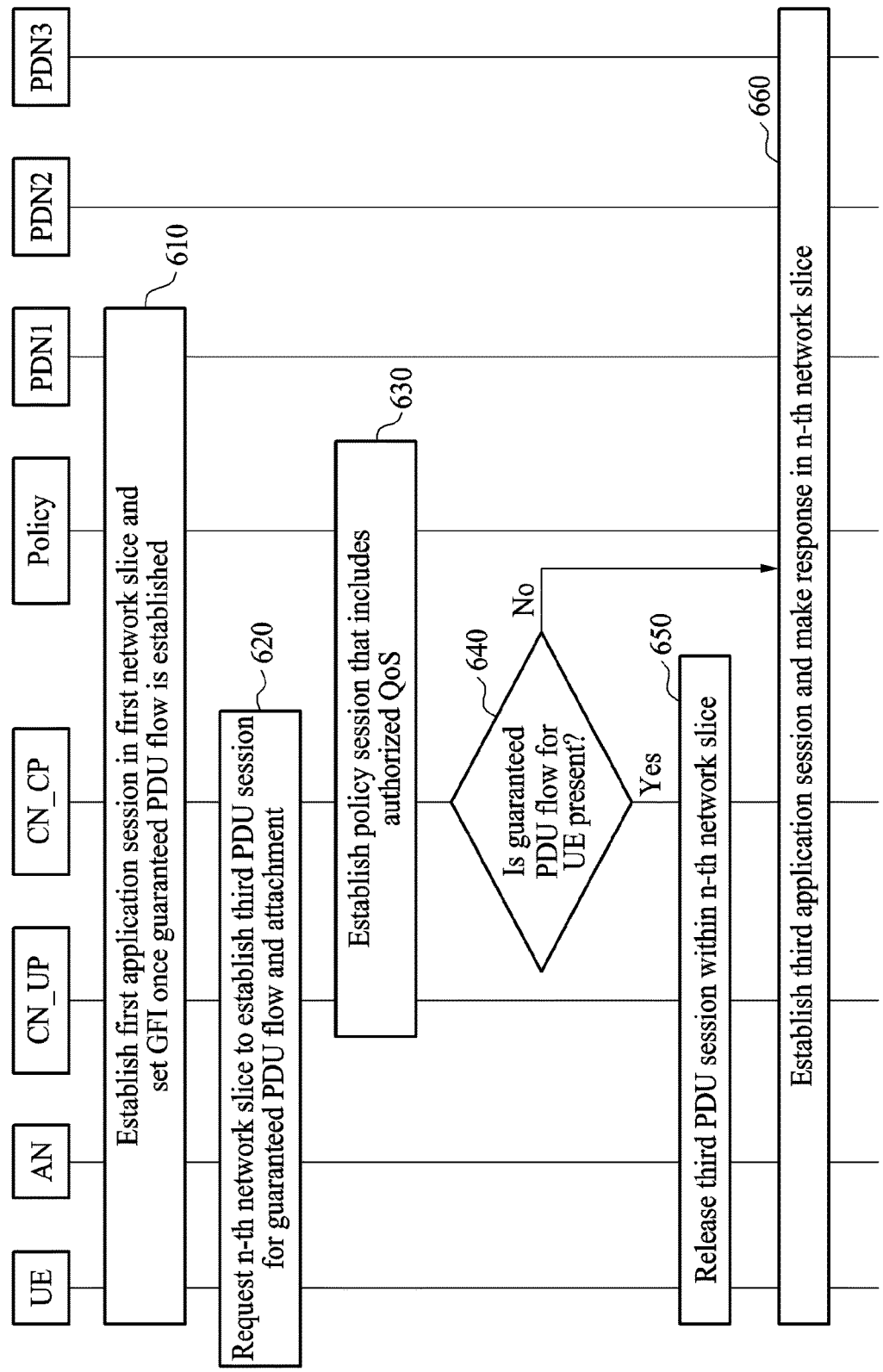
FIG. 6 illustrates an example of a process of establishing a service session based on a guaranteed packet data unit (PDU) flow indicator (GFI) according to an example embodiment.

FIG. 6 illustrates an example of a process of establishing a service session based on a GFI according to an example embodiment.

A communication method for establishing a service session based on a GFI according to an example embodiment is described with reference to FIG. 6.

In a long term evolution (LTE) system according to an example embodiment, a single UE or user may use only a single guaranteed PDU flow. Here, in the LTE system, the guaranteed PDU flow may indicate a guaranteed EPS bearer.

In a 5G mobile communication system, a single UE may simultaneously use multiple network slices. Thus, a guaranteed PDU flow may be included in a single network slice or different network slices corresponding to different PDNs based on a mobile communication provider policy. That is, in the 5G mobile communication system, a guaranteed PDU flow may be present per network slice for PDN providers, which allows the UE to use a plurality of guaranteed PDU flows. Here, regardless of whether the UE admits a single guaranteed PDU flow or whether the UE admits a plurality of guaranteed PDU flows, only a single guaranteed PDU flow may need to be present within a network slice. Also, although only a single guaranteed PDU flow is present, the UE may use a plurality of network slices. Thus, there is a need to manage in which network slice the guaranteed PDU flow is present. The example embodiments may include all of the aforementioned cases, for example, a case in which a single guaranteed PDU flow is present per UE and a case in which a single guaranteed PDU flow is present per PDN that serves the UE.

The example embodiment of FIG. 6 may correspond to a case in which only a single guaranteed PDU flow is allowed for the UE. In this case, the UE may establish a PDN1 application service session. Here, CN_CP of a network slice that performs a current session establishment function may determine whether a guaranteed PDU flow is present within a service currently being used by the UE through collaboration with a policy.

Unless the guaranteed PDU flow is present, a GFI may be set such that the guaranteed PDU flow may not be generated in another network slice used or available by the single UE. Information about the set GFI may be stored in the UE, an AN, CN_UP, CN_CP, the policy, and the like.

When at least one guaranteed PDU flow is allowed in multiple network slices (even in this case, only a single guaranteed PDU flow is allowed per network slice, the GFI may include information about a number of available guaranteed PDU flows. Information about a network slice that admits the allowed at least one guaranteed PDU flow may be stored.

FIG. 6 illustrates a communication method performed in response to a request for a second guaranteed PDU flow in a case in which only a single guaranteed PDU flow is allowed per UE.

Referring to FIG. 6, in operation 610, a first application session may be established in a first network slice. Once a guaranteed PDU flow is established, a GFI may be set.

In operation 620, an n-th network slice may be requested for a third PDU session for the guaranteed PDU flow. That is, the second guaranteed PDU flow may be requested in the n-th network slice different from the first network slice in which the guaranteed PDU flow is established.

In operation 630, a policy session that includes authorized QoS may be established.

In operation 640, CN_CP may determine whether to establish the guaranteed PDU flow through collaboration with a policy. For example, the CN_CP may verify whether the guaranteed PDU flow for the UE is present.

When the guaranteed PDU flow for the UE is verified to be present, a new guaranteed PDU flow may not be established in the n-th network slice. In this case, a third PDU session within the n-th network slice may be released in operation 650. The UE may be informed that the requested PDU session may not be established.

When the guaranteed PUD flow for the UE is verified to be absent, the new guaranteed PDU flow may be established in the n-th network slice. In operation 660, GFI information may be set and stored in the UE, the AN, CN_UP, CN_CP, the policy, and the like. For example, a third application session may be established in the n-th network slice and a response may be made.

Figure 7:
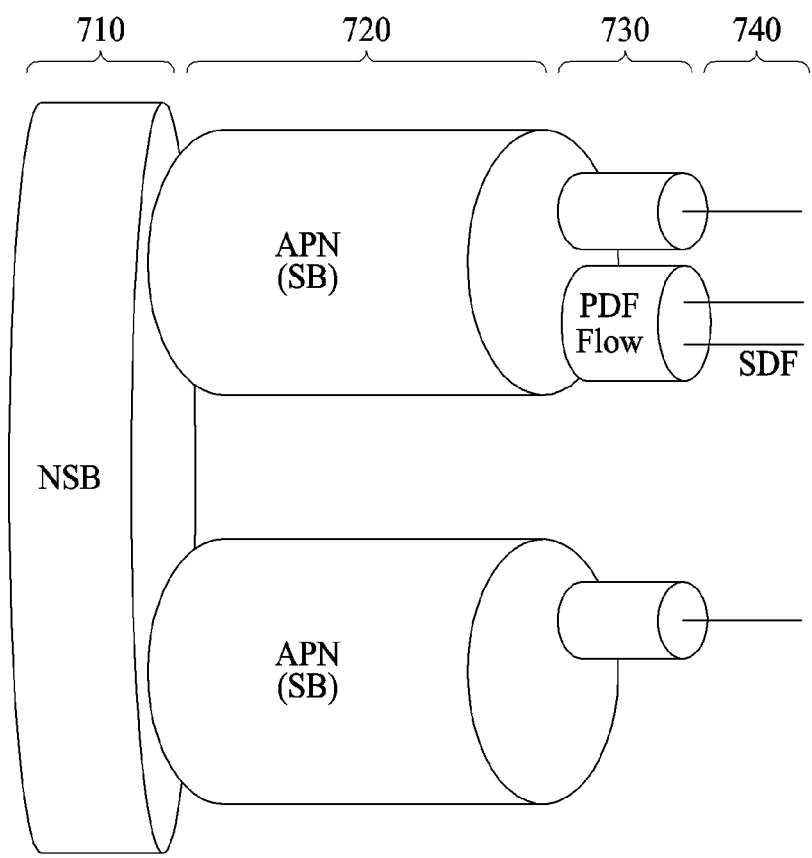
FIG. 7 illustrates an example of a hierarchical structure of quality of service (QoS) parameters applied to a network slice according to an example embodiment.

FIG. 7 illustrates a hierarchical structure of QoS parameters applied to a network slice according to an example embodiment.

Referring to FIG. 7, an NSB 710, an APN 720, a PDU flow 730, and a service data flow (SDF) 740 are hierarchically illustrated. The NSB 710, the APN 720, the PDU flow 730, and the SDF 740 may represent QoS parameters.

The NSB 710 indicates a bitrate authorized for an uplink (UL) and a downlink (DL) per network slice. The NSB 710 may include at least one APN 720.

The APN 720 represents an access point network and may express a bitrate for an access point network session as an SB. The APN 720 may include at least one PDU flow 730.

The PDU flow 730 represents a packet data network flow and may express a bitrate for a packet data network flow as an SB. The PDU flow 730 may include at least one SDF 740.

The SDF 740 represents a service data flow and may be requested from a PDN or a UE.

Figure 8:
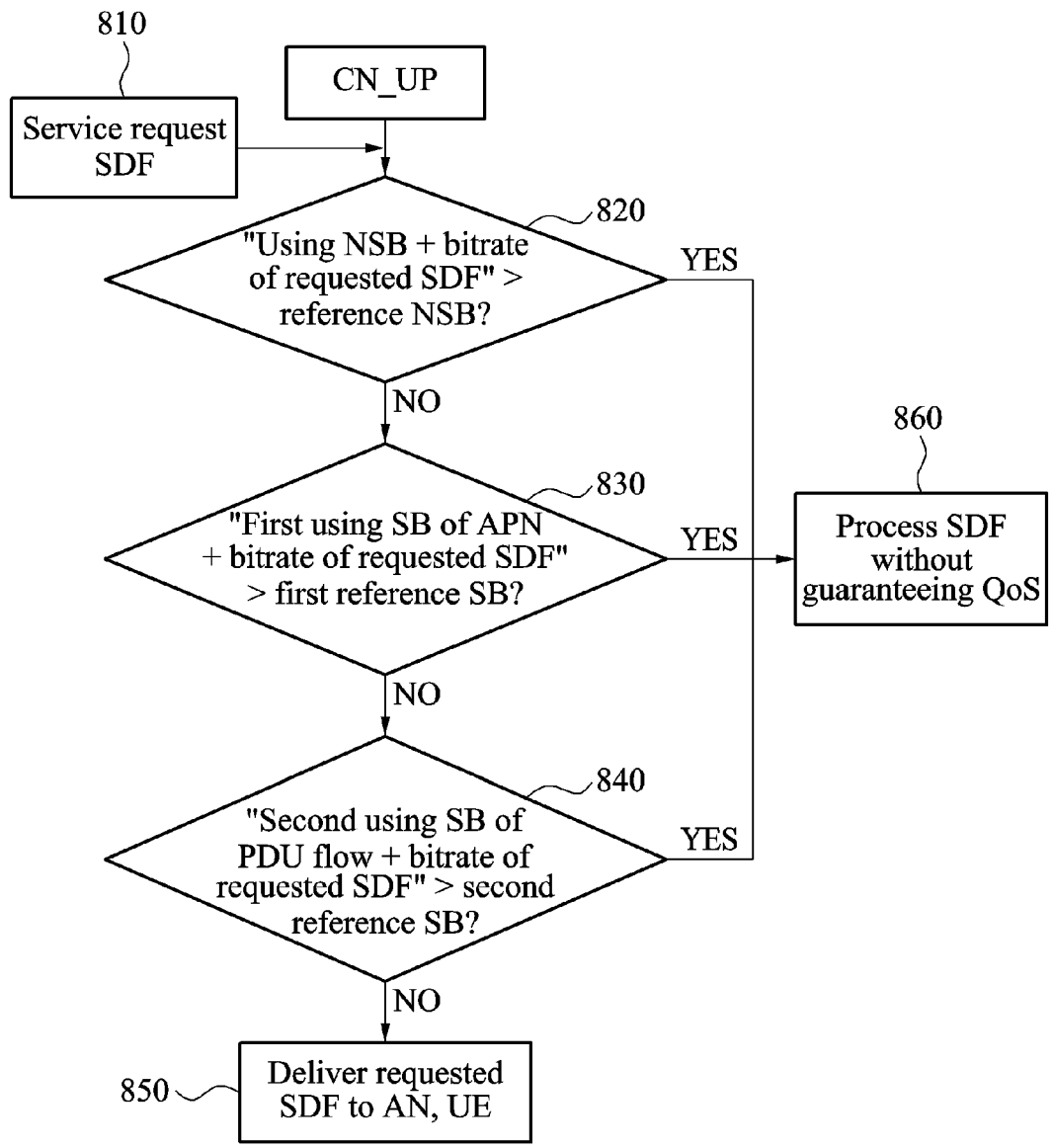
FIGS. 8 and 9 illustrate examples of a hierarchical QoS policing procedure about a downlink flow in a core network according to an example embodiment.
Figure 9:
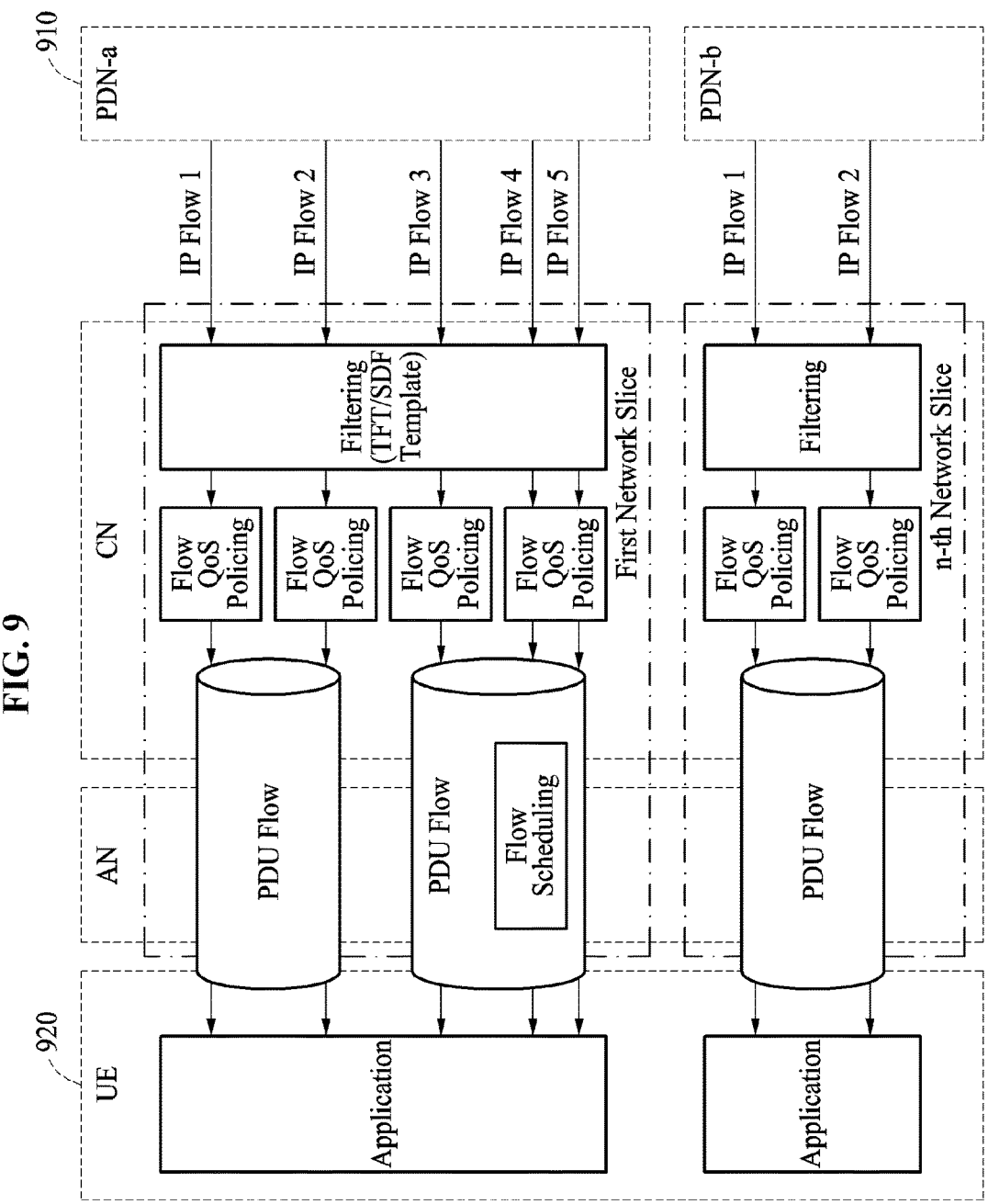

FIGS. 8 and 9 illustrate examples of a hierarchical QoS policing procedure about a downlink (DL) flow in a core network according to an example embodiment.

FIG. 8 illustrates an example of a communication method based on a hierarchical QoS policing procedure in a downlink flow according to an example embodiment. Operations 810 through 860 of FIG. 8 may be performed by CN_UP.

Once an IP flow is delivered from a PDN to a CN, the IP flow may be separated into SDFs within 5G mobile communication through filtering. QoS enforcement may be performed on a service flow using a QoS policy for each SDF. Here, QoS policing may be used to process an SDF by verifying whether an NSB is satisfied, by verifying whether a session bitrate (SB) is satisfied, and the like, based on the hierarchical structure of FIG. 7. Hereinafter, a further description is made with reference to FIG. 8.

In operation 810, the CN_UP may receive a service request SDF. For example, the CN_UP may receive a requested SDF from the PDN.

In operation 820, the CN_UP determines whether a first sum of a bitrate of the SDF requested from the PDN and a using NSB of a network slice corresponding to the requested SDF exceeds a reference NSB allocated to the network slice. Here, the using NSB indicates a bitrate currently being used in the corresponding network slice. The reference NSB may be preset at a bitrate capable of being processed in the corresponding network slice.

When the first sum is determined to not exceed the reference NSB, the CN_UP determines whether a second sum of the bitrate of the requested SDF and a first using SB of an APN corresponding to the requested SDF exceeds a first reference SB allocated to the APN in operation 830. Here, the first using SB indicates a bitrate currently being used in the corresponding APN, and the first reference SB may be preset at a bitrate capable of being processed in the corresponding APN.

When the second sum is determined to not exceed the first reference SB, the CN_UP determines whether a third sum of the bitrate of the requested SDF and a second using SB of a PDU flow corresponding to the requested SDF exceeds a second reference SB allocated to the PDU flow in operation 840. Here, the second using SB indicates a bitrate currently being used in the corresponding PDU flow, and the second reference SB may be preset at a bitrate capable of being processed in the corresponding PDU flow.

When the third sum is determined to not exceed the second reference SB, the CN_UP may deliver the requested SDF to an AN and a UE in operation 850. That is, the CN_UP processes the requested SDF to guarantee that quality of the requested SDF is greater than or equal to a predetermined level.

When the first sum exceeds the reference NSB, when the second sum exceeds the first reference SB, or when the third sum exceeds the second reference SB, the CN_UP may process the requested SDF without guaranteeing the QoS in operation 860. That is, the CN_UP may process the requested SDF without guaranteeing that the quality of the requested SDF is greater than or equal to the predetermined level. For example, a packet that includes the requested SDF exceeding at least one of the reference NSB, the first reference SB, and the second reference SB may be discarded.

The procedure of FIG. 8 may relate to SDF traffic within a non-guaranteeing PDU flow. In the non-guaranteeing PDU flow, flow scheduling may be performed based on an SB in the AN. That is, when a sum of a using SB of the requested PDU flow and the bitrate of the requested SDF exceeds the reference SB, the requested SDF may be delivered to the UE or discarded depending on a packet circumstance within the PDU flow.

When a guaranteed bitrate per UE allocated by a mobile communication provider is exceeded, an SDF within a guaranteed PDU flow may affect the quality.

FIG. 9 illustrates an example of QoS policing using an NSB when downlink service data is delivered from a mobile communication provider, for example, PDN-a and PDN-b, 910 to a UE 920 according to an example embodiment.

Figure 10:
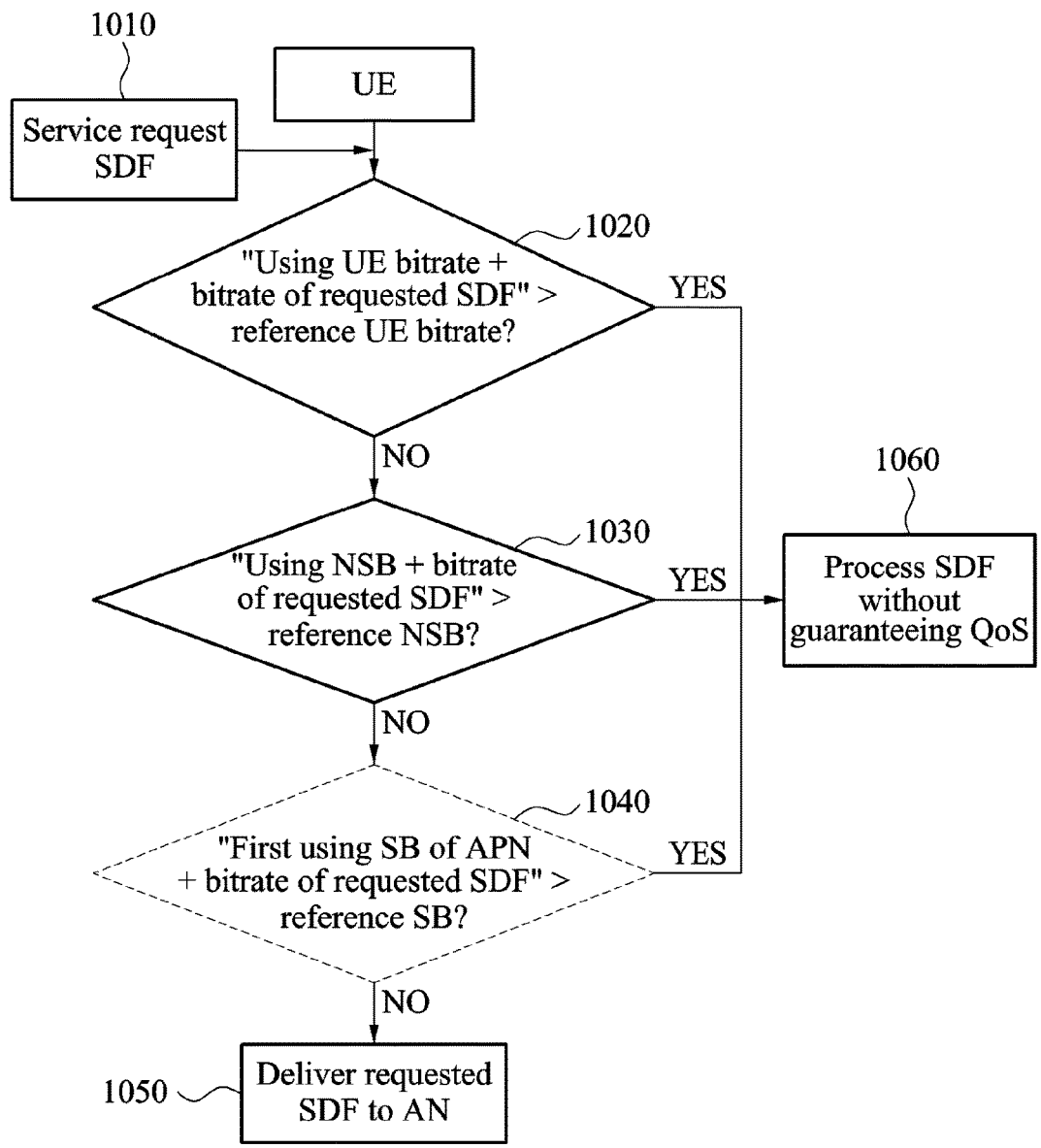
FIGS. 10 and 11 illustrate examples of a hierarchical QoS policing procedure about an uplink flow in a UE according to an example embodiment.
Figure 11:
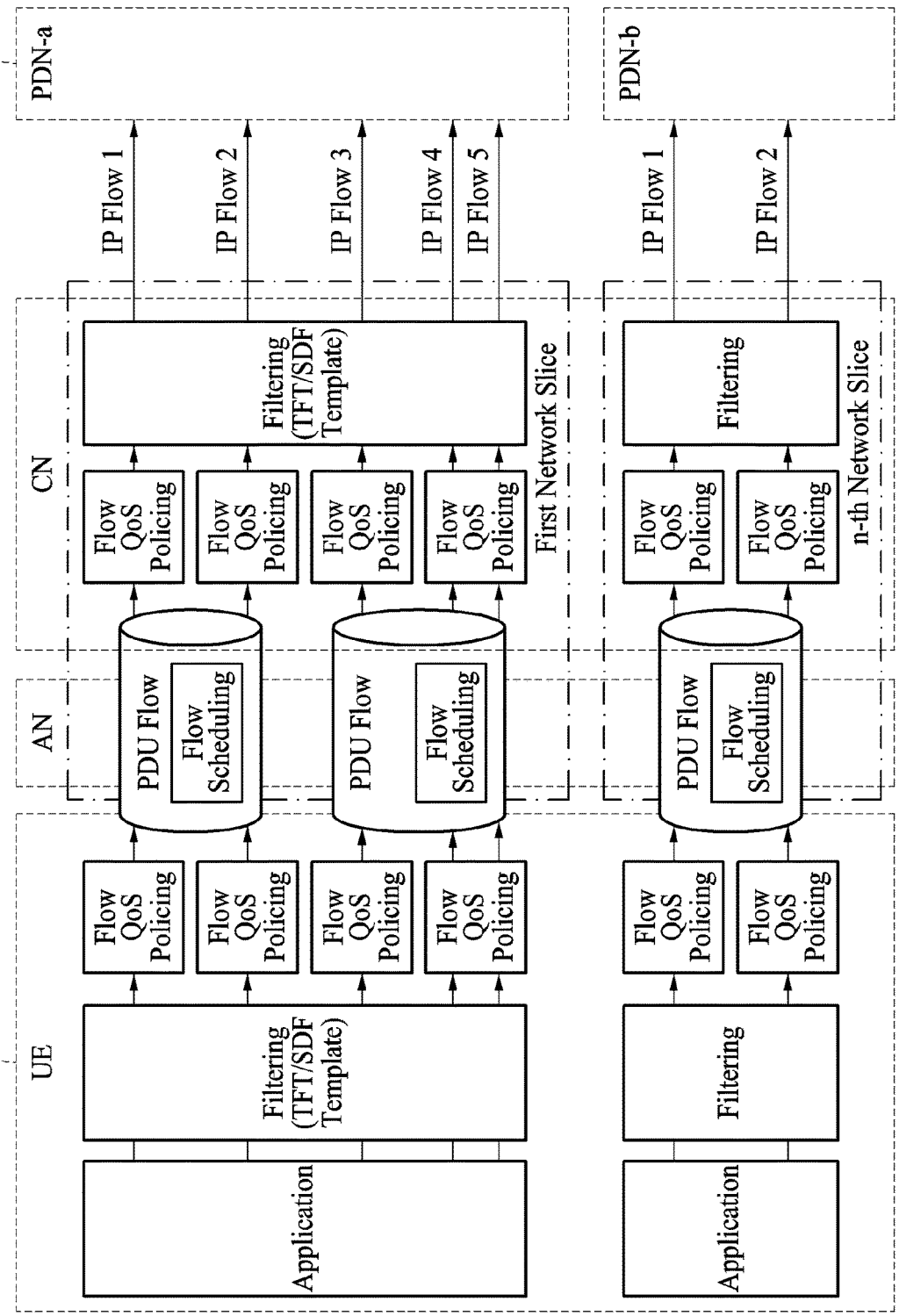

FIGS. 10 and 11 illustrate examples of a hierarchical QoS policing procedure about an uplink flow in a UE according to an example embodiment.

FIG. 10 illustrates an example of a communication method of processing an uplink service data flow based on a hierarchical QoS policing procedure in an uplink flow according to an example embodiment. Operations 1010 through 1060 of FIG. 10 may be performed by a UE. A guaranteed PDU flow and a non-guaranteed PDU flow may be separately processed.

Referring to FIG. 10, in operation 1010, the UE may request an SDF. A service request SDF may be generated.

In operation 1020, the UE determines whether a first sum of a bitrate of the requested SDF and a using UE bitrate of the UE exceeds a reference UE bitrate allocated to the UE. Here, the using UE bitrate indicates a bitrate currently being used by the UE and the reference UE bitrate may be preset at a bitrate capable of being processed by the corresponding UE.

The UE may include information associated with a reference NSB per network slice. The reference NSB per network slice needs to be greater than or equal to a sum of reference SBs within a corresponding network slice.

When the first sum is determined to not exceed the reference UE bitrate, the UE determines whether a second sum of the bitrate of the requested SDF and a using NSB of a network slice corresponding to the requested SDF exceeds a reference NSB allocated to the corresponding network slice in operation 1030. Here, the using NSB indicates a bitrate currently being used in the corresponding network slice, and the reference NSB may be preset at a bitrate capable of being processed in the corresponding network slice.

Depending on example embodiments, operation 1040 may be omitted. In this case, if the second sum does not exceed the reference NSB, the UE processes the requested SDF to guarantee that quality of the requested SDF is greater than or equal to a predetermined level in operation 1050.

Depending on example embodiments, operation 1040 may be additionally performed. In this case, when the second sum is determined to not exceed the reference NSB, the UE may determine whether a third sum of the bitrate of the requested SDF and a using SB of an APN corresponding to the requested SDF exceeds a reference SB allocated to the APN. Here, the using SB indicates a bitrate currently being used in the corresponding APN and the reference SB may be preset at a bitrate capable of being processed in the corresponding APN.

When operation 1040 is additionally performed, the UE may process the requested SDF to guarantee that quality of the requested SDF is greater than or equal to a predetermined level only with respect to a case in which the third sum does not exceed the reference SB in operation 1050.

When the first sum exceeds a reference UE bitrate, when the second sum exceeds the reference NSB, or when the third sum exceeds the reference SB, the UE may process the requested SDF without guaranteeing QoS in operation 1060. That is, the UE may process the requested SDF without guaranteeing that the quality of the requested SDF is greater than or equal to the predetermined level. For example, a packet that includes the requested SDF exceeding at least one of the reference UE bitrate, the reference NSB, and the reference SB may be discarded.

The aforementioned procedures of FIG. 10 relate to the non-guaranteeing PDU flow.

An SDF within a guaranteed PDU flow according to an example embodiment may be policed based on a guaranteed bitrate allocated by a mobile communication provider. That is, a packet that includes an SDF exceeding an allocated value may be discarded.

In the AN, the non-guaranteed PDU flow may be scheduled based on a sum of requested flow traffic and currently using traffic, the reference UE bitrate, and the reference NSB. The guaranteed PDU flow may be scheduled based on a sum of requested flow traffic and currently using traffic and an allocated reference guaranteed bitrate.

In the CN, traffic of a non-guaranteed PDU flow may be policed using the reference SB and the reference NSB and then delivered to a PDN through filtering and SDF policing.

Also, traffic of a guaranteed PDU flow may be delivered to the PDN through filtering and SDF policing.

An NSP according to an example embodiment may indicate a priority level between network slices. The NSP may be present for each network slice. For example, a network slice having a relatively high priority level among a plurality of network slices for the same service may admit a relatively small number of flows and may allocate more resources, and may provide a high quality of service, for example, a premium service at all times. On the contrary, a network slice having a relatively low priority level may admit a relatively large number of flows and may provide an average quality of service.

In addition, among the plurality of network slices for the same service, a relatively high priority level may be allocated to a network service available in case of an emergency situation and a relatively low priority level may be allocated to a network slice for an average service. That is, even in an emergency situation, for example, a disaster state, the UE or the AN may allow only a network slice having a relatively high priority level to be selected. Even in this case, if a situation is allowed, a network service having a relatively low priority level may be selected for a minimal network service.

FIG. 11 illustrates an example of QoS policing using an NSB when uplink service data is delivered from a UE 1110 to a PDN 1120 according to an example embodiment. Here, a guaranteed PDU flow and a non-guaranteed PDU flow may be separately processed.

Figure 12:
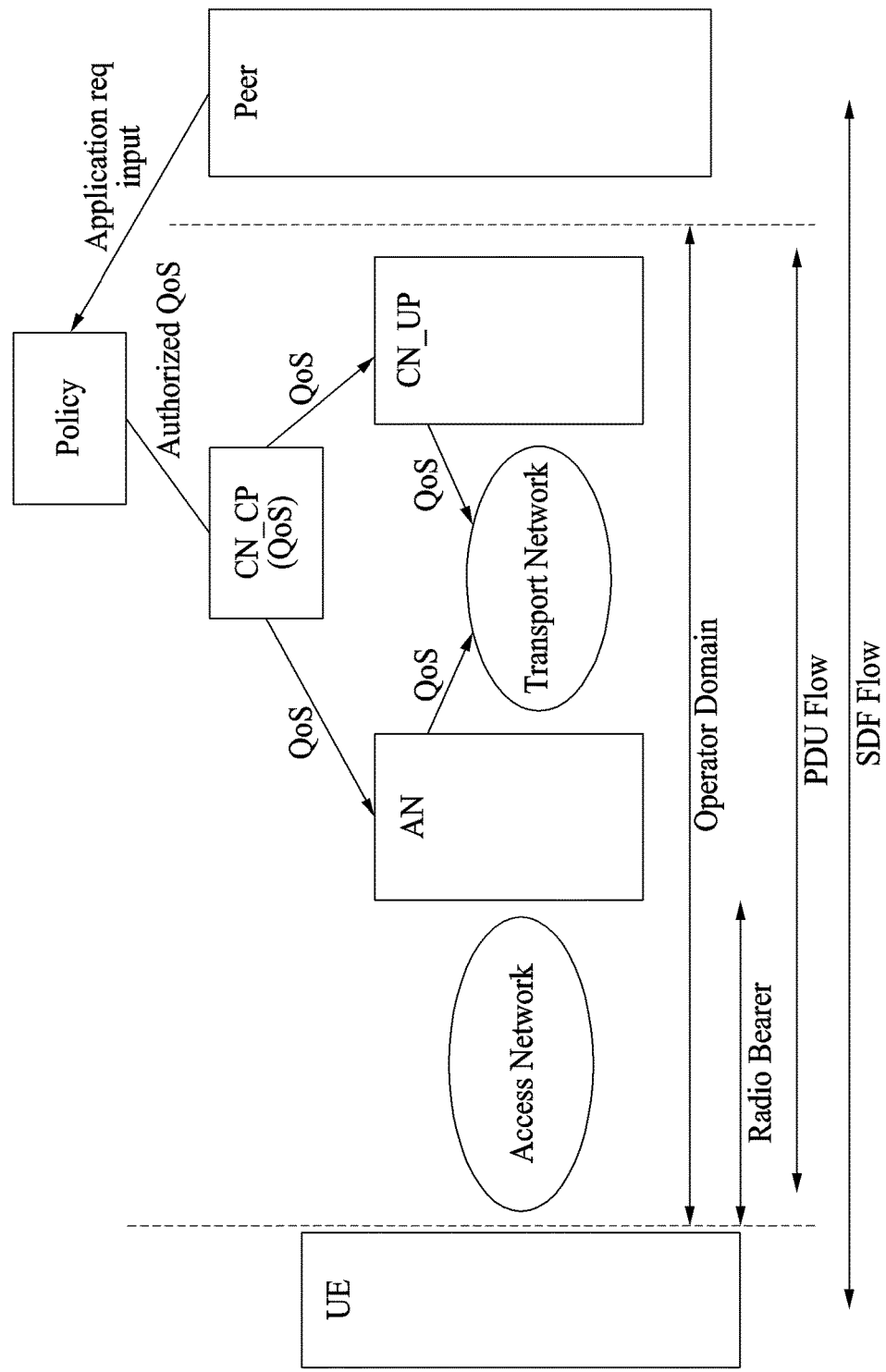
FIG. 12 illustrates an example of a relationship between a packet data unit (PDU) flow and a service data flow (SDF) according to an example embodiment.

FIG. 12 illustrates an example of a relationship between a PDU flow and an SDF according to an example embodiment.

Hereinafter, the relationship between the PDU flow and the SDF is described with reference to FIG. 12.

The PDU flow may be a logical packet transport of defined characteristics, that is, corresponding to the finest granularity of packet forwarding/treatment differentiation that a PDU session may provide to an SDF. The PDU session may be associated with a plurality of logical PDU flows realized in a user plane (UP) layer. An application within a service layer may require at least one SDF that may be mapped to at least one PDU flow. For this solution, a PDU flow between the UE and a CN-UP termination of an operator domain may be equivalent to an EPS bearer in an EPS QoS framework. The PDU flow may be classified into service-specific and non-service-specific PDU flows.

QoS parameters assigned to the PDU flow and/or the SDF may be enforced by network functions.

Application Requirements Input

A network may need to be aware of application requirements to apply accurate QoS parameters to an application's SDF.

Application requirements information may be provided from a service layer (server or client side) as follows:

Service identification:

The service indication refers to how to identify an SDF associated with an application.

An SDF may be of an IP type or a non-IP type depending on a PDU session type.

Service behavior (behavior that the network may expect from the application), such as:

A maximum bitrate per SDF, that is, a maximum bitrate that the service is expected to deliver.

Service requirements (network delivery behavior requested by the application), such as:

A minimum bitrate per SDF, that is, a minimum bitrate that is required for the service to be delivered with sufficient QoE Delay requirements.

Priority between different SDFs within the application

Requested network behavior with respect to admission, retention, and notification Requested measurement window size, to indicate a condition when observing the service behavior and requirements fulfillment. Here, the measurement window size may be specified to a predetermined size or may be adaptively configured.

Network authorized QoS parameters

Application requirements input from a service layer and a QoS configuration as well as operator policies, QoS parameters for a network slice, for a PDU session, for service-specific and non-service-specific PDU flows, and for SDFs may be determined.

QoS parameters per network slice:

An NSB indicates an UL and DL authorized bitrate per network slice. The NSB may define the limit of an aggregated maximum bitrate of non-guaranteed flows for each network slice.

An NSP indicates a priority level of a network slice. A network slice of a relatively high NSP may have more resources, higher reliability/availability, and higher survivability in an emergency state than a network slice of a relatively low NSP. The NSP may be used to distinguish a public service, a premium service, and an emergency service.

QoS parameters per PDU session: aggregated maximum bitrate for the session.

QoS-related parameters for service-specific and non-service specific PDU flows:

Traffic flow templates and filters (if applicable) may be used to classify an SDF to which the QoS parameters are applied. A TFT filter may be defined to classify an IP flow and a non-IP flow. For example, Ethernet flows may be classified based on an Ethernet p-bit.

A PDU flow priority indicates a priority per PDU flow for admission to network resources. For example, the PDU flow priority may represent a method that enables traffic associated with a flow to be handled in an AN, at an administration and resource management and in CN_UP.

A maximum bitrate per PDU flow indicates a UL and DL authorized bitrate value for a single PDU flow. The maximum bitrate per PDU flow may be applied to service-specific and non-service-specific PDU flows.

A required bitrate per PDU flow indicates a bitrate (that is, a minimum or guaranteed bitrate per flow) that is required for a service to be delivered with sufficient QoE.

A delivery characteristic per PDU flow may include, for example, a packet delay budget and a packet loss/late rate. The delivery characteristic may be expressed using a scalar value, such as a QoS class identifier (QCI) value, or may be explicitly indicated.

A network behavior per PDU flow indicates an expected treatment if QoS targets represented by authorized QoS parameters for the flow are not met by a network.

QoS related parameters per SDF indicate traffic templates that are used to classify an SDF to which the QoS parameters are applied. A TFT filter may be defined to classify IP and non-IP flows. For example, Ethernet flows may be classified based on an Ethernet p-bit.

An SDF priority indicates a priority per SDF for admission to network resources. For example, the SDF priority may represent a method that enables traffic associated with a flow to be handled in a network at an admission and resource management and in CN_UP.

A maximum bitrate per SDF indicates a UL and DL authorized bitrate value for a single SDF.

A required bitrate per SDF indicates a bitrate (that is, a minimum or guaranteed bitrate per flow) that is required for a service to be delivered with sufficient QoE.

A delivery characteristic per SDF may include, for example, a packet delay budget and a packet loss/delay rate. The delivery characteristic may be expressed using a scalar value, such as a QCI value, or may be explicitly indicated.

A network behavior per SDF indicates an expected treatment if QoS targets represented by authorized QoS parameters for a flow are met by the network.

Flow Priority

The flow priority may be a parameter indicating a relative priority that fulfils a required bitrate and delivery characteristics, for example, a delay budget and a packet loss/late rate. The flow priority affects SDF/PDU flow admission to resources in the network and a distribution of resources for a packet forwarding treatment. Thus, the consistency in admission and resource distribution may be allowed to fulfill the service requirements.

Network Behavior Per Flow

The network behavior per flow may indicate the following behaviors:

Admission may be performed in a case in which a flow needs to be admitted in a network although there are not enough network resources to fulfill the service requirements (required bitrate and/or delivery characteristics) associated with a flow that may not be met (keep/drop).

Retention may be performed in a case in which a flow may be discontinued to allow the network to admit a flow having a relatively high priority (Retain/May be dropped).

Notification may be performed in a case in which a network element needs to transmit a notification (to a policy function) if service requirements associated with the flow may not be met (Yes/No).

The network behavior may be applied to all of the SDF/PDU flow.

Figure 13:
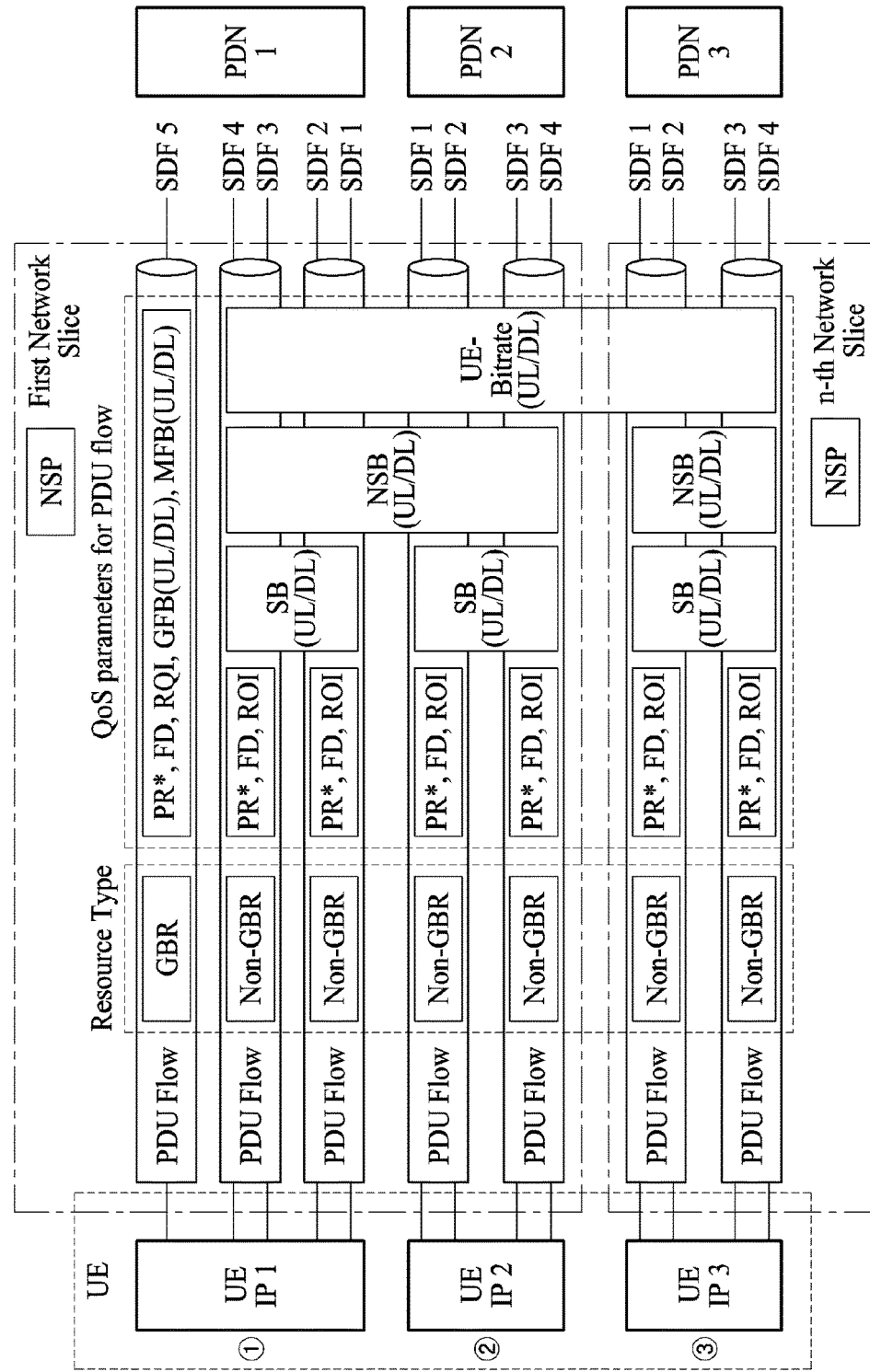
FIG. 13 illustrates an example of QoS parameters associated with a relationship between a PDU flow and SDFs according to an example embodiment.

FIG. 13 illustrates an example of QoS parameters associated with a relationship between a PDU flow and SDFs according to an example embodiment.

FIG. 13 conceptually illustrates QoS parameters according to an example embodiment.

A new set of QoS parameters may need to be defined when a UE is simultaneously served by multiple network slices having a plurality of PDU sessions in a next generation system. FIG. 13 represents a relationship between a PDU flow and SDFs with QoS parameters. An NSB may need to be set in a network for QoS enforcement of each network slice.

Referring to FIG. 13, PR* may include a flow priority indicator (FPI), a flow priority level (FPL), a packet priority indicator (PPI), a packet discard priority indicator (PDPI), and a reflective QoS indication.

A QoS policy may be stored and set at CP functions in order to be enforced at UP functions and to be transferred to the AN and the UE for QoS enforcement.

At this stage, the following parameters may be required to define a QoS framework.

A flow priority indicator (FPI) may define a priority per flow treatment at UP and AN functions. The FPI may correspond to scheduling priority as well as handling priority in case of congestion. Also, the FPI may indicate whether a flow requires a guaranteed flow bitrate and/or a maximum flow bitrate.

A flow descriptor may indicate a packet filter associated with a specific flow treatment. Uplink identification may be performed in the UE and the AN, however, may be limited to layer 2 (L2) (for example, for an Ethernet PDU type) or layers 3 and 4 (L3 and L4) (for example, for an IP PDU session type). In a request for uplink resources to a RAN, the UE specifies the FPI linked to the identified packet that the UE desires to transmit.

A maximum flow bitrate (MFB) indicates a UL and DL bitrate value applicable to a single flow or an aggregation of flows. The MFB may indicate a maximum bitrate authorized for a data flow identified by the flow descriptor.

A guaranteed flow bitrate (GFB) indicates a UL and DL bitrate value applicable to a single flow or an aggregation of flows. The GFB may indicate a bitrate authorized for a data flow.

If deducible, the flow descriptor may be assigned to application traffic detected by an application detection function. The flow descriptor may be linked to the GFB that may be applied to a deducible flow. Otherwise, a default flow descriptor may be assigned to a non-deducible flow and the GFB may be applied.

Here, an MFB of a guaranteed flow may be set to be greater than or equal to the GFB.

A flow priority level (FPL) may be used to define a flow relative importance for accessing an AN resource. Also, the FPL may indicate whether an access to AN non-prioritized resources needs to be pre-emptable and whether allocated resources need to be protected from pre-emption.

A session bitrate (SB) indicates a UL and DL bitrate value applicable to an established user session. The SB may indicate a maximum bitrate authorized for a user session.

A network slice bitrate (NSB) indicates a UL and DL bitrate value applicable to an attached network slice. The NSB may indicate a maximum bitrate authorized for each network slice.

A reflective QoS indication (RQI) indicates a DL indication applicable to a single flow or an aggregation of flows. When the RQI is used as U-plane marketing, the RQI may be determined by UP functions and may be applied on a per-packet basis for lifetime of a flow.

Hereinafter, two types of user plane per-packet marketing information are described.

A packet priority indicator (PPI) may be used to define scheduling priority per packet at UP and AN functions. Different PPIs may be marked to packets in the same flow by NextGen UP functions and the UE to identify different scheduling priority of the packets. Here, the PPI or the FPI may be assumed to be used as a user plane per-packet marking.

A packet discard priority indicator (PDPI) may be used to define a discard priority per packet in a NextGen system in case of congestion, which is to differentiate contents within the same flow. PDPI marking in a downlink may be set by UP functions and may be used by the AN.

Figure 14:
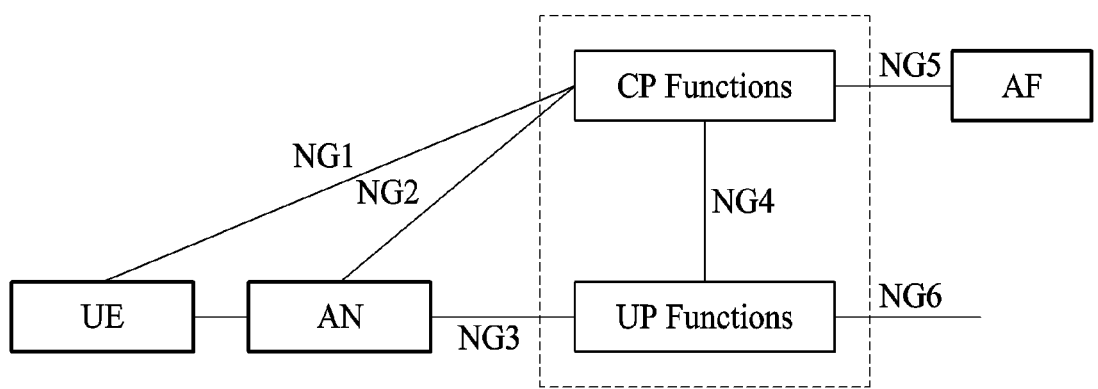
FIGS. 14 through 16 illustrate examples of a flow-based QoS architecture according to an example embodiment.
Figure 15:
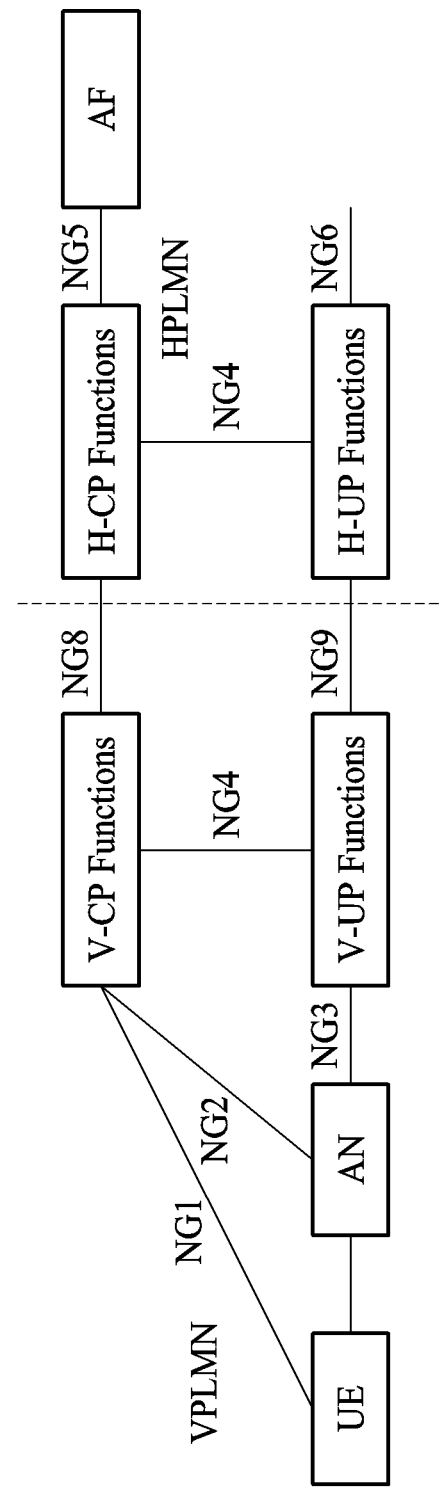
Figure 16:
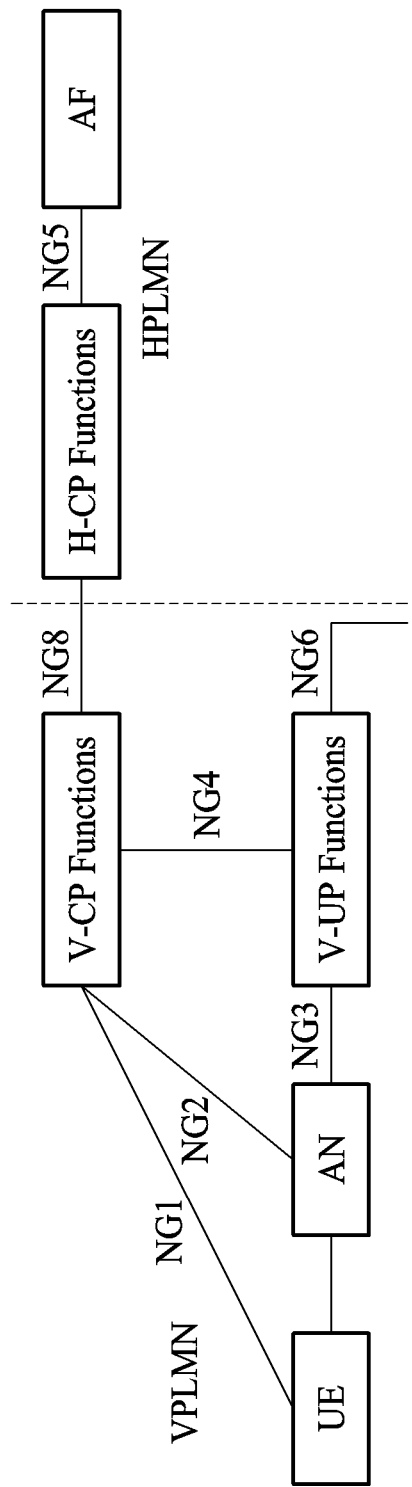

FIGS. 14 through 16 illustrate examples of a flow-based QoS architecture according to an example embodiment.

FIG. 14 illustrates an example of a flow-based QoS non-reaming architecture that may be used in the aforementioned QoS framework.

FIG. 15 illustrates an example of a flow-based QoS architecture for roaming and home routing.

FIG. 16 illustrates an example of a flow-based QoS architecture for roaming and local breakout.

The examples of FIGS. 14 through 16 may not assume a specific number of CP and UP functions. Also, CP and UP functions may have been grouped for the illustrative purposes.

FIG. 17 illustrates an example of QoS parameters according to an example embodiment.

Referring to FIG. 17, QoS parameters (for example, an FPI, an FPL, a PPI, a PDPI, a flow descriptor, an MFB, a GFB, an SB, an NSB, and an RQI) are illustrated in association with UP functions, an AN, and a UE.

Figure 18:
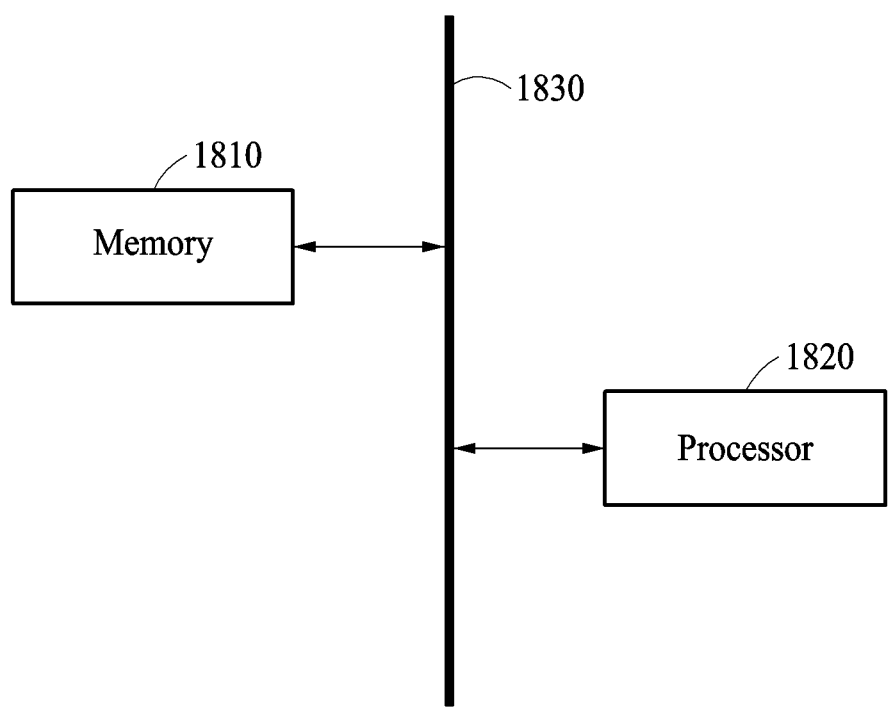
FIG. 18 illustrates an example of a communication apparatus or a UE according to an example embodiment.

FIG. 18 illustrates an example of a communication apparatus or a UE according to an example embodiment.

Hereinafter, a communication apparatus 1800 or a UE 1800 according to an example embodiment is described with reference to FIG. 18.

Referring to FIG. 18, the communication apparatus 1800 may include a memory 1810 and a processor 1820. The memory 1810 and the processor 1820 may communicate with each other through a bus 1830.

The memory 1810 may include computer-readable instructions. The processor 1820 may perform the aforementioned operations in response to an execution of an instruction stored in the memory 1810 by the processor 1820. The memory 1810 may be a volatile memory or a non-volatile memory.

The processor 1820 may execute instructions or programs, or may control the communication apparatus 1800. The communication apparatus 1800 may be configured as a portion of various computing apparatuses. In addition, the communication apparatus 1800 may process the aforementioned operation.

The processor 1820 of the communication apparatus 1800 determines whether a first sum of a bitrate of an SDF requested from a PDN and a using NSB bitrate of a network slice corresponding to the requested SDF exceeds a reference NSB allocated to the network slice. When the first sum is determined to not exceed the reference NSB, the processor 1820 determines whether a second sum of the bitrate of the requested SDF and a first using SB of an APN corresponding to the requested SDF exceeds a first reference SB allocated to the APN. When the second sum is determined to not exceed the first reference SB, the processor 1820 determines whether a third sum of the bitrate of the requested SDF and a second using SB of a PDU flow corresponding to the requested SDF exceeds a second reference SB allocated to the PDU flow. When the third sum is determined to not exceed the second reference SB, the processor 1820 processes the requested SDF to guarantee that quality of the requested SDF is greater than or equal to a predetermined level.

According to another example embodiment, the UE 1800 may include the memory 1810 and the processor 1820. The memory 1810 and the processor 1820 may communicate with each other through the bus 1830.

The memory 1810 may include computer-readable instructions. The processor 1820 may execute instructions or programs, or may control the communication apparatus 1800.

The processor 1820 of the UE 1800 determines whether a first sum of a bitrate of an SDF requested from the UE 1800 and a using UE bitrate of the UE 1800 exceeds a reference UE bitrate allocated to the UE 1800. When the first sum is determined to not exceed the reference UE bitrate, the processor 1820 determines whether a second sum of the bitrate of the requested SDF and a using NSB of a network slice corresponding to the requested SDF exceeds a reference NSB allocated to the network slice. When the second sum is determined to not exceed the reference NSB, the processor 1820 processes the requested SDF to guarantee that quality of the requested SDF is greater than or equal to a predetermined level.

The description made with reference to FIGS. 1 through 17 may be applied to the components of FIG. 18 and a further description is omitted.

The units and/or modules described herein may be implemented using hardware components, software components, and/or combination thereof. For example, the hardware components may include microphones, amplifiers, bandpass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include plurality of processing elements and plurality of types of processing elements. For example, a processing device may include plurality of processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a communication apparatus that communicates with a user equipment (UE), the method comprising:
    determining whether a first sum of a bitrate of a service data flow (SDF) requested from a packet data unit (PDU) and a using network slice bitrate (NSB) of a network slice corresponding to the requested SDF exceeds a reference NSB allocated to the network slice;
    determining whether a second sum of the bitrate of the requested SDF and a first using session bitrate (SB) of an access point network (APN) corresponding to the requested SDF exceeds a first reference SB allocated to the APN, when the first sum is determined to not exceed the reference NSB;
    determining whether a third sum of the bitrate of the requested SDF and a second using SB of a PDU flow corresponding to the requested SDF exceeds a second reference SB allocated to the PDU flow, when the second sum is determined to not exceed the first reference SB; and
    processing the requested SDF to guarantee that a quality of the requested SDF is greater than or equal to a predetermined level, when the third sum is determined to not exceed the second reference SB.

2. The method of claim 1, wherein the processing of the requested SDF comprises delivering the requested SDF to the UE using the predetermined level or more of quality.

3. The method of claim 1, further comprising:
    processing the requested SDF without guaranteeing that the quality of the requested SDF is greater than or equal to the predetermined level in response to an occurrence of at least one of a case in which the first sum exceeds the reference NSB, a case in which the second sum exceeds the first reference SB, and a case in which the third sum exceeds the second reference SB.

4. The method of claim 1, wherein the reference NSB is determined for each network slice to be used by the UE based on a number of network slices to be used by the UE.

5. The method of claim 1, wherein at least one of the reference NSB, the first reference SB, and the second reference SB is set by a control plane function of the communication apparatus and applied to a user plane function of the communication apparatus.

6. The method of claim 1, wherein the requested SDF is processed based on a scheduling priority according to a flow priority indicator (FPI) set to the PDU flow corresponding to the requested SDF or a handling priority in case of congestion.

7. The method of claim 1, wherein the requested SDF corresponds to a non-guaranteed PDF flow.

8. The method of claim 1, wherein traffic of the PDF flow is processed on a user plane of a core network and an access network based on a PDU flow priority for admission to a network resource that is provided from the communication apparatus.

9. The method of claim 1, wherein the determining whether the first sum exceeds the reference NSB, the determining whether the second sum exceeds the first reference SB, and the determining whether the third sum exceeds the second reference SB is performed on a user plane of a core network of the communication apparatus.

10. The method of claim 1, further comprising:
    performing flow scheduling on the requested SDF based on the first reference SB on an access network of the communication apparatus.

11. A communication apparatus comprising:
    a processor; and
    a memory configured to store at least one instruction executable by the processor,
    wherein, when the at least one instruction is executed by the processor, the processor is configured:
    to determine whether a first sum of a bitrate of a service data flow (SDF) requested from a packet data unit (PDU) and a using network slice bitrate (NSB) of a network slice corresponding to the requested SDF exceeds a reference NSB allocated to the network slice,
    to determine whether a second sum of the bitrate of the requested SDF and a first using session bitrate (SB) of an access point network (APN) corresponding to the requested SDF exceeds a first reference SB allocated to the APN, when the first sum is determined to not exceed the reference NSB,
    to determine whether a third sum of the bitrate of the requested SDF and a second using SB of a PDU flow corresponding to the requested SDF exceeds a second reference SB allocated to the PDU flow, when the second sum is determined to not exceed the first reference SB, and
    to process the requested SDF to guarantee that a quality of the requested SDF is greater than or equal to a predetermined level, when the third sum is determined to not exceed the second reference SB.

12. The communication apparatus of claim 11, wherein the processor is configured to process the requested SDF without guaranteeing that the quality of the requested SDF is greater than or equal to the predetermined level in response to an occurrence of at least one of a case in which the first sum exceeds the reference NSB, a case in which the second sum exceeds the first reference SB, and a case in which the third sum exceeds the second reference SB.

13. The communication apparatus of claim 11, wherein the reference NSB is determined for each network slice to be used by a UE that communicates with the communication apparatus, based on a number of network slices to be used by the UE.

* * * * *